(12) United States Patent
Akiyama

(10) Patent No.: US 10,675,688 B2
(45) Date of Patent: Jun. 9, 2020

(54) HIGH-SPEED GROOVING METHOD

(71) Applicant: Toshiba Kikai Kabushiki Kaisha, Tokyo-to (JP)

(72) Inventor: Takanobu Akiyama, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 0 days.

(21) Appl. No.: 16/116,549

(22) Filed: Aug. 29, 2018

(65) Prior Publication Data
US 2019/0061008 A1 Feb. 28, 2019

(30) Foreign Application Priority Data
Aug. 30, 2017 (JP) ................... 2017-165719

(51) Int. Cl.
*B23B 5/08* (2006.01)
*B23B 21/00* (2006.01)
*B23D 11/00* (2006.01)

(52) U.S. Cl.
CPC ............ *B23B 5/08* (2013.01); *B23D 11/00* (2013.01); *B23B 2220/12* (2013.01); *B23B 2226/31* (2013.01); *B23C 2226/31* (2013.01)

(58) Field of Classification Search
CPC ... B23B 2220/12; B23B 2226/31; B23B 5/08; B23C 2226/31; B23D 11/00
See application file for complete search history.

(56) References Cited

U.S. PATENT DOCUMENTS

| | | | | |
|---|---|---|---|---|
| 1,949,512 A | * | 3/1934 | Norton | B23B 1/00 29/28 |
| 3,276,301 A | * | 10/1966 | Fotheringham | B23D 21/04 82/70.2 |
| 3,564,957 A | * | 2/1971 | Markgraf | G05B 19/0405 82/118 |
| 5,003,851 A | * | 4/1991 | Kawada | B23B 27/005 407/117 |
| 5,050,468 A | * | 9/1991 | Nydigger | B23Q 1/4828 700/160 |
| 2004/0003690 A1 | * | 1/2004 | Katoh | B23Q 5/045 82/121 |

(Continued)

FOREIGN PATENT DOCUMENTS

JP 2004223836 A * 8/2004
JP 2007-331054 12/2007

*Primary Examiner* — Sara Addisu
(74) *Attorney, Agent, or Firm* — DLA Piper LLP US

(57) ABSTRACT

A method for machining grooves in the surface of a workpiece in which a dummy groove is machined in the surface of the workpiece by moving a cutting tool relative to the workpiece in a first machining direction of the workpiece, then orienting the cutting tool 180 degrees as compared to the first machining, and subsequently second machining the dummy groove by moving the cutting tool in a second direction opposite to the first direction. A displacement of a cutting edge of the cutting tool, caused by the first and second machining of the dummy groove is measured. A groove is machined with the cutting tool in a forward stroke and then a return stoke with the cutting tool rotated 180 degrees between the strokes. A relative position between the workpiece and the cutting tool during the forward and return strokes is corrected so as to eliminate the displacement.

6 Claims, 9 Drawing Sheets

(56) References Cited

U.S. PATENT DOCUMENTS

| | | | |
|---|---|---|---|
| 2007/0084315 A1* | 4/2007 | Trice | B23B 27/04 |
| | | | 82/1.11 |
| 2007/0251360 A1* | 11/2007 | Akiyama | B23B 3/162 |
| | | | 82/53.1 |
| 2008/0187266 A1* | 8/2008 | Akiyama | B23B 5/08 |
| | | | 384/590 |
| 2009/0120250 A1* | 5/2009 | Akiyama | B23B 5/08 |
| | | | 82/133 |
| 2011/0277603 A1* | 11/2011 | Uchimura | B23B 5/08 |
| | | | 82/159 |

* cited by examiner

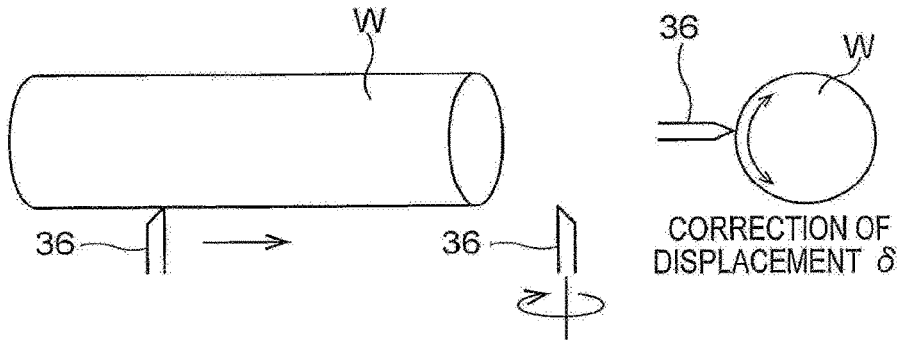
FIG. 7A  FIRST ROUGH MACHINING
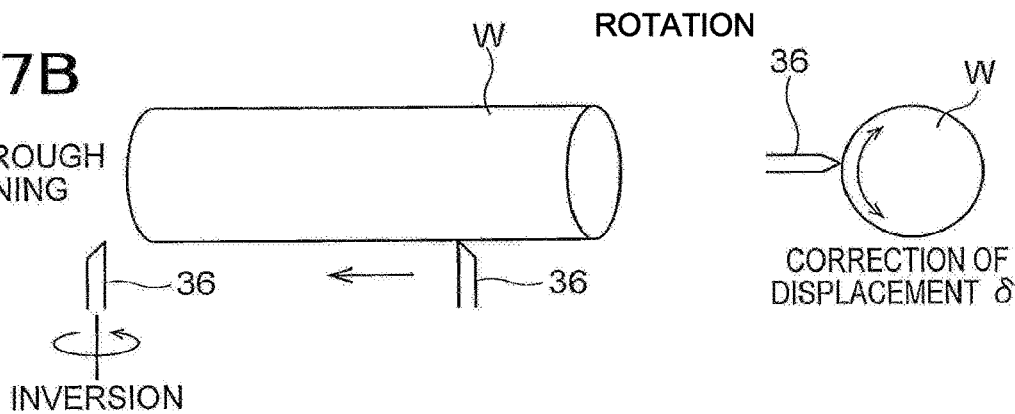
FIG. 7B  SECOND ROUGH MACHINING
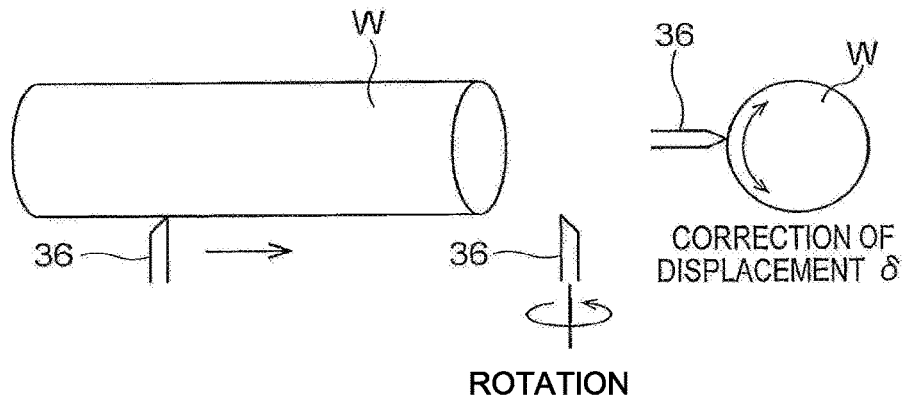
FIG. 7C  PRE-FINISH MACHINING
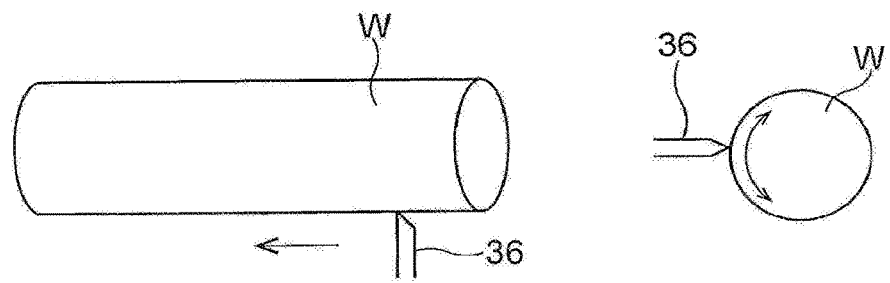
FIG. 7D  FINISH MACHINING FIG. 9A 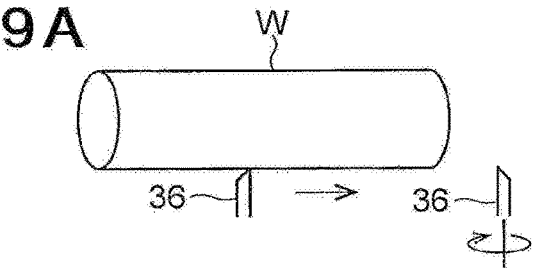 
FIRST ROUGH MACHINING L1
FIG. 9B 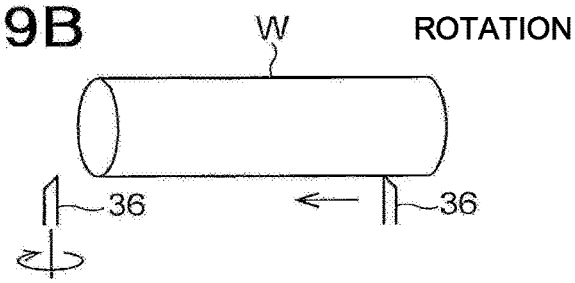 
BACKWARD MOVEMENT WITHOUT CUTTING R1
FIG. 9C 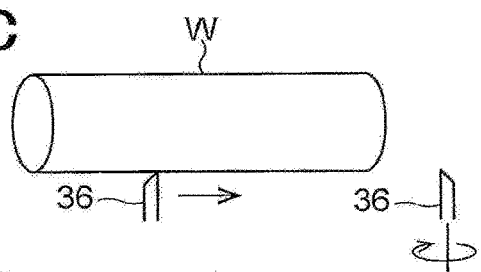 
SECOND ROUGH MACHINING L2
FIG. 9D 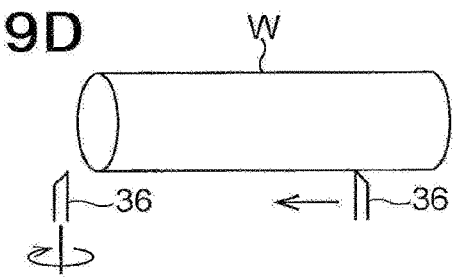 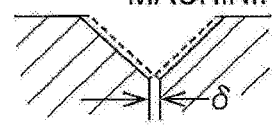
PRE-FHINISH MACHINING R2
FIG. 9E 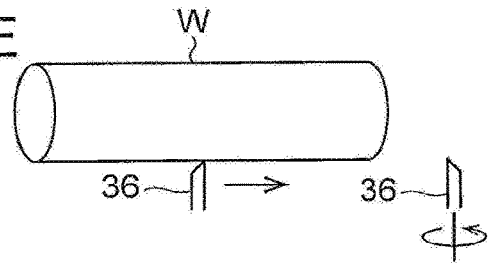 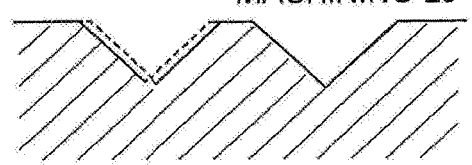
FIRST ROUGH MACHINING L3
FIG. 9F 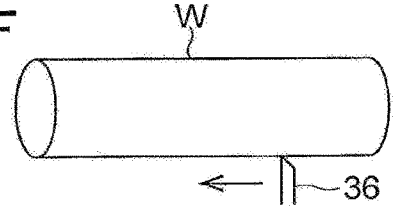 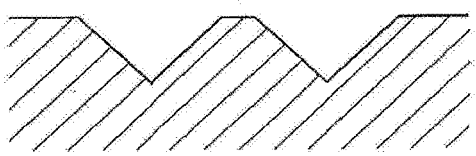
FINISH MACHINING R3 | FIRST ROUGH MACHINING L3

HIGH-SPEED GROOVING METHOD

CROSS REFERENCE TO RELATED APPLICATIONS

This application is a U.S. Non-Provisional Application, which claims priority from Japanese Patent Application No. JP 2017-165719 filed Aug. 30, 2017. The entirety of the above-listed application is incorporated herein by reference.

TECHNICAL FIELD

The present invention relates to a grooving method for machining fine grooves in a workpiece at a high speed.

BACKGROUND ART

Ultra-precision roll turning lathes have recently been developed which achieve ultra-precision machining of a roll for molding a lenticular lens sheet, a cross lenticular lens sheet, a prism sheet, or the like (see, for example, patent document 1).

Such an ultra-precision roll turning lathe includes a tool post having a diamond tool attached thereto, installed on a carriage, and is basically used to machine circumferential grooves in a roll while rotating the roll by means of a headstock and feeding the carriage in a forward-backward direction (X-axis direction). In the case of machining grooves in the axial direction of a roll, the carriage is moved at a high speed in the longitudinal direction (Z-axis direction) of the roll while performing circumferential indexing of the roll (on a C-axis) with the headstock. In this manner, grooves can be created in the axial direction of the roll.

The use of such an ultra-precision roll turning lathe can machine with precision numerous grooves, e.g. having a pitch of 50 μm and a depth of 25 μm, in the surface of a roll in the circumferential or longitudinal direction of the roll.

CITATION LIST

Patent Document

Patent document 1: Japanese Patent Laid-Open Publication No. 2007-331054

SUMMARY OF THE INVENTION

In the case of machining circumferential grooves in a roll by using an ultra-precision roll turning lathe, each groove can be machined by allowing a diamond tool to cut in the rotating roll in the X-axis direction. The next groove can be machined after moving a carriage a distance equal to the pitch of the grooves. In this manner, the grooves can be efficiently machined.

In the case of machining longitudinal grooves in a roll, on the other hand, each groove is machined with a diamond tool while moving the carriage a distance equal to the full length of the roll. It takes a long time to machine all the longitudinal grooves in the entire surface of the roll for the following reasons.

Firstly, the movement speed of the carriage is as slow as about 10 to 20 meters/minute; therefore, it takes time even to feed the carriage from one end to the other end of the roll, e.g. having a length of about 2 meters, in the longitudinal direction of the roll. A second reason is related to a characteristic of a diamond tool: The rake face of a diamond tool must always face in a cutting direction during machining of a groove. A diamond tool has only one rake face. Therefore, after machining a groove with a diamond tool during a forward stroke, the groove cannot be further machined during a return stroke because the rake face of the diamond tool faces in the opposite direction to the movement direction, i.e. the cutting direction, of the diamond tool. Thirdly, machining of each groove is performed in a plurality of steps, such as rough machining, pre-finish machining and finish machining steps. For example, in the case of machining longitudinal grooves in four steps, the carriage needs to be reciprocated four times to complete machining of each groove.

When, for example, machining longitudinal 90-degree grooves, having a pitch of 50 μm and a depth of 25 μm, in a roll having a diameter of 450 mm and a surface length of 4700 mm in four steps for each groove, it will take about 22 days, if the operation proceeds smoothly, even to machine the longitudinal grooves continuously without interruption.

In addition, a power failure or an earthquake can occur during such long-term machining. In the event of a power failure or an earthquake, discontinuation of the machining may produce a streak in the machining surface of the roll, which will make the roll commercially useless. Thus, machining of the grooves will have to be restarted from the beginning.

The present invention has been made in view of the above problems in the prior art. It is therefore an object of the present invention to provide a high-speed grooving method which, when machining fine grooves in the surface of a workpiece by using an ultra-precision roll turning lathe or a planer machine, can machine each groove not only during a forward stroke of a cutting tool but also during a return stroke of the cutting tool, and can therefore significantly increase the machining efficiency.

Disclosed is a high-speed grooving method for cutting and machining fine grooves in the surface of a workpiece by moving a cutting tool relative to the workpiece. A dummy groove is first machined in the surface of the workpiece by moving the cutting tool relative to the workpiece in a first machining direction of the workpiece. Then the cutting tool is oriented 180 degrees as compared to the first machining. The dummy groove is machined in a second machining by moving the cutting tool in a second direction opposite to the first direction. A displacement of a cutting edge of the cutting tool, caused by the first and second machining of the dummy groove, is measured. A groove in the surface of the workpiece is machined with the cutting tool in a forward stroke by moving the cutting tool relative to the workpiece in the first direction. After completion of the forward-stroke machining, the cutting tool is oriented 180 degrees from the orientation during the forward-stroke machining, thereby setting an orientation of the cutting edge of the cutting tool to a direction opposite to a first orientation of the cutting edge in the forward stroke so that the workpiece can be machined during a return stroke of the cutting tool. A relative position between the workpiece and the cutting tool is corrected so as to eliminate the displacement. The groove, which has been machined in the forward stroke, is machined with the cutting tool by moving the cutting tool relative to the workpiece in the direction opposite to the first direction in a return stroke, wherein the forward-stroke machining, the cutting tool orienting, the correcting and the return-stroke machining are repeated to perform a machining process, including a rough machining step and a finish machining step, for machining a single groove.

BRIEF DESCRIPTION OF THE DRAWINGS

FIGS. 7A through 7D are diagrams illustrating an exemplary machining process, including steps of correcting a displacement δ by indexing of a roll, according to the high-speed grooving method of the present invention;

FIGS. 9A through 9F are diagrams illustrating an exemplary machining process according to a high-speed grooving method of a second embodiment of the present invention.

DESCRIPTION OF EMBODIMENTS

Embodiments of the high-speed grooving method according to the present invention will now be described with reference to the attached drawings.

First Embodiment

Figure 1:
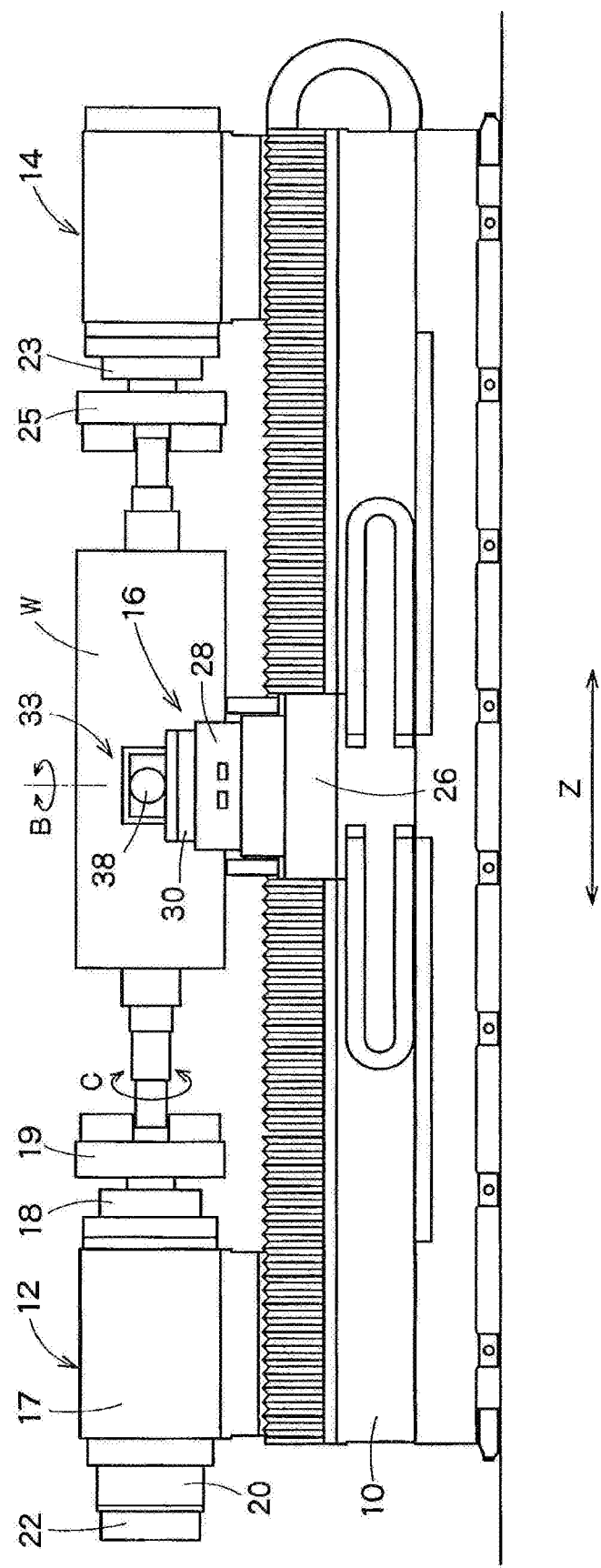
FIG. 1 is a side view of a precision roll turning lathe for performing a high-speed grooving method according to a first embodiment of the present invention.
Figure 2:
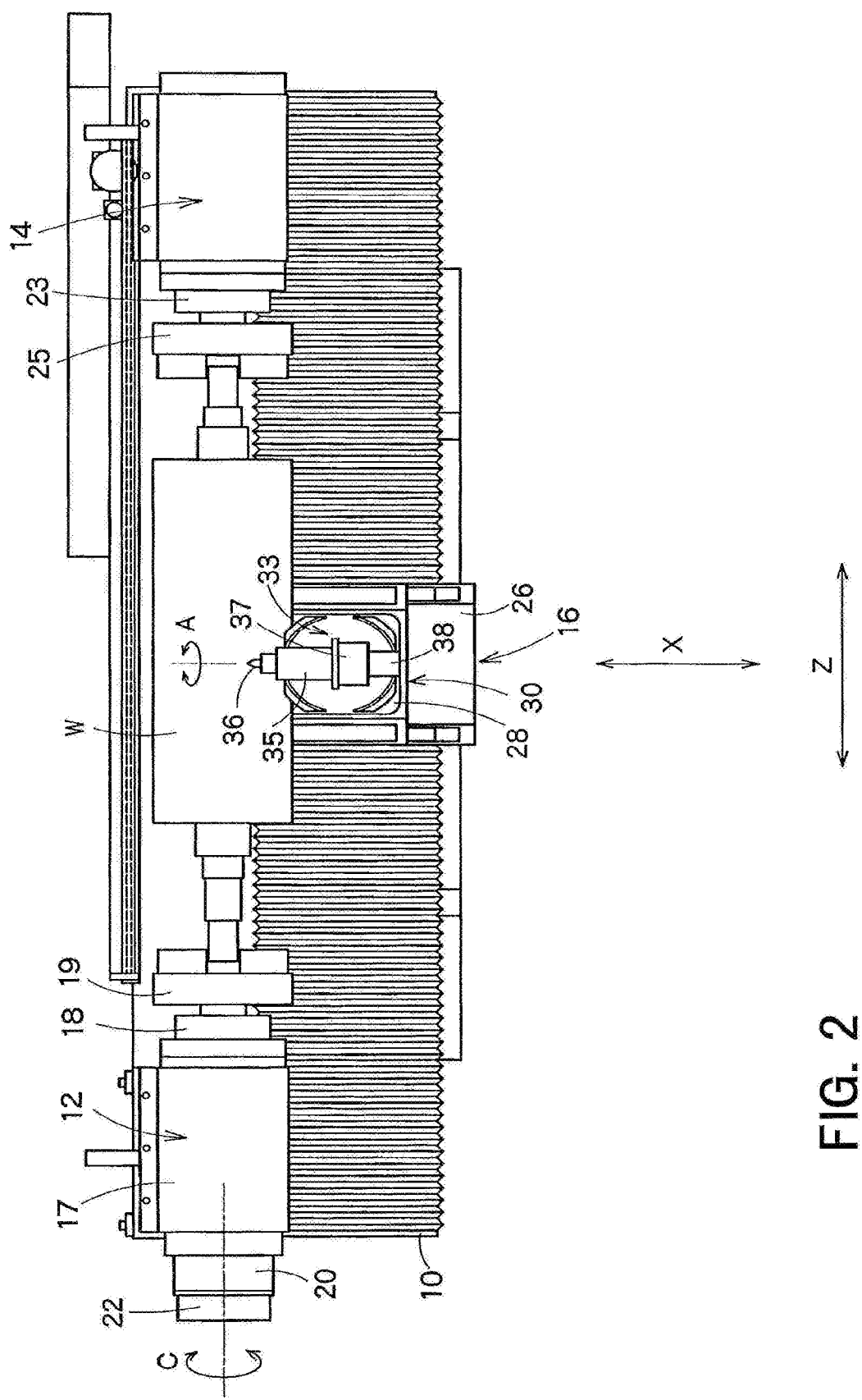
FIG. 2 is a plan view of the precision roll turning lathe of FIG. 1.

FIG. 1 is a side view of a precision roll turning lathe for performing a high-speed grooving method according to a first embodiment of the present invention, and FIG. 2 is a plan view of the precision roll turning lathe.

In FIGS. 1 and 2, reference numeral 10 denotes a bed. On the bed 10 are mounted a headstock 12, a tail stock 14 and a carriage 16. A roll W as a workpiece is rotatably supported by the headstock 12 and the tail stock 14.

The headstock 12 is disposed on one longitudinal end of the bed 10. The headstock 12 includes a body 17, a main spindle 18, a chuck 19 secured to the front end of the main spindle 18, and a servo motor 20 for driving the main spindle 18. The main spindle 18 is supported by a not-shown hydrostatic oil bearing provided within the body 17. The chuck 19 holds a one-end spindle of the roll W and transmits the rotation of the main spindle 18 to the roll W. In the headstock 12, the servo motor 20 drives the main spindle 18 to rotate the roll W at a high speed. The amount of rotation of the servo motor 20 is detected with an encoder 22 and the amount of rotation of the servo motor 20 is controlled, whereby the headstock 12 can perform circumferential indexing of the roll W (about the C-axis). Instead of the hydrostatic oil bearing, other types of bearings, such as an air bearing, may be used to support the main spindle 18.

The tail stock 14 is disposed on the bed 10 and opposite the headstock 12. A not-shown guide surface is provided in the upper surface of the bed 10 so that the tail stock 14 can be moved along the guide surface. The tail stock 14 has a main spindle 23 instead of a conventional common tail spindle, and rotatably supports an opposite-end spindle of the roll W by means of a chuck 25 mounted to the main spindle 23. Such tail stock 14 basically has the same construction as the headstock 12 except for having no servo motor.

A description will now be given of the carriage 16.

The carriage 16 includes a saddle 26 mounted on the bed 10 movably in the longitudinal direction of the roll W. A table 28 is mounted on the saddle 26 movably in a direction perpendicular to the longitudinal direction of the roll W. In the precision roll turning lathe of this embodiment, the axis along which the saddle 26 is fed is termed the Z-axis, and the axis along which the table 28 is fed on the saddle 26 is termed the X-axis, which is perpendicular to the Z-axis.

Figure 3:
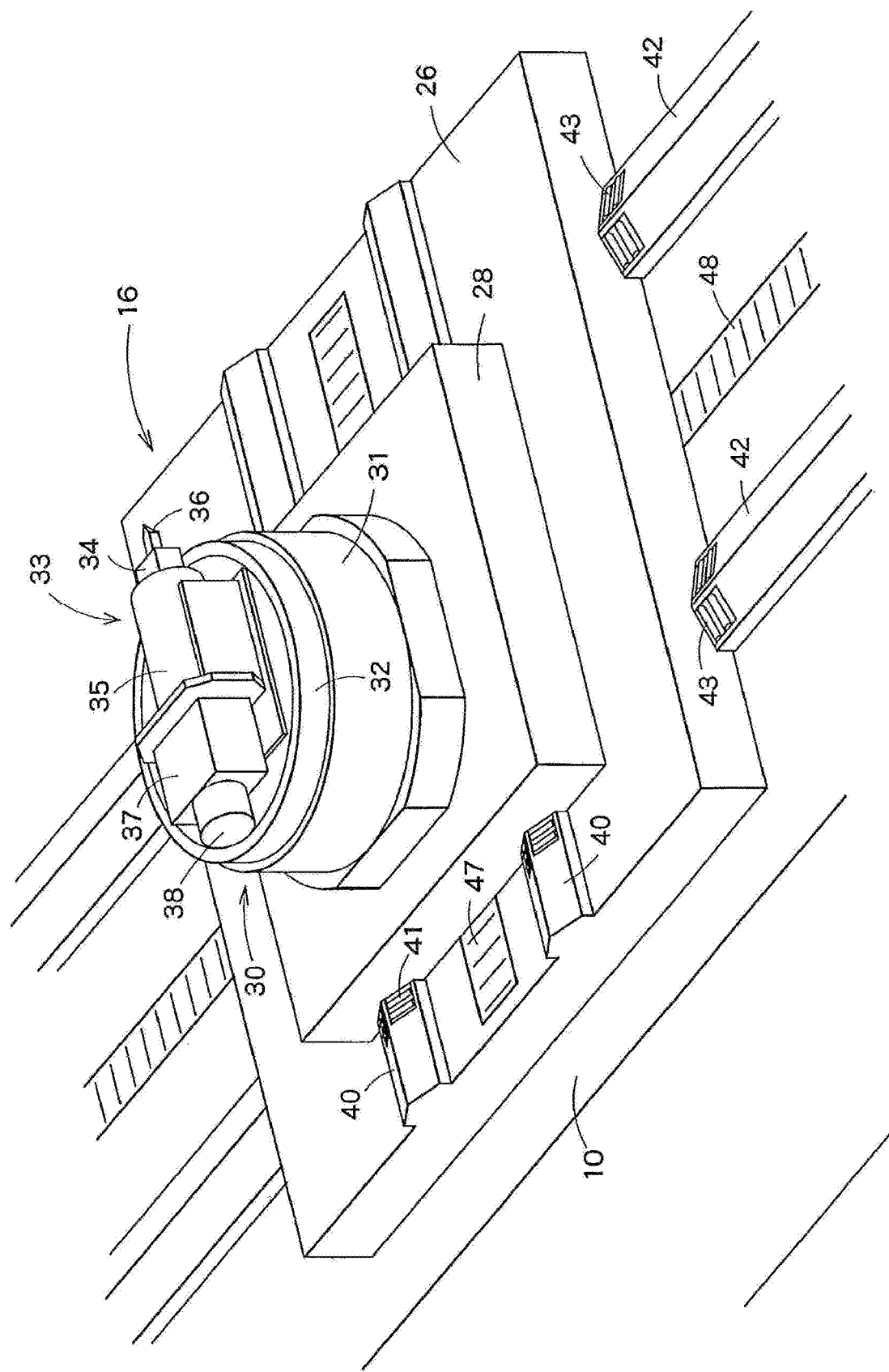
FIG. 3 is a perspective view of a swivel provided in the precision roll turning lathe of FIG. 1.
Figure 4:
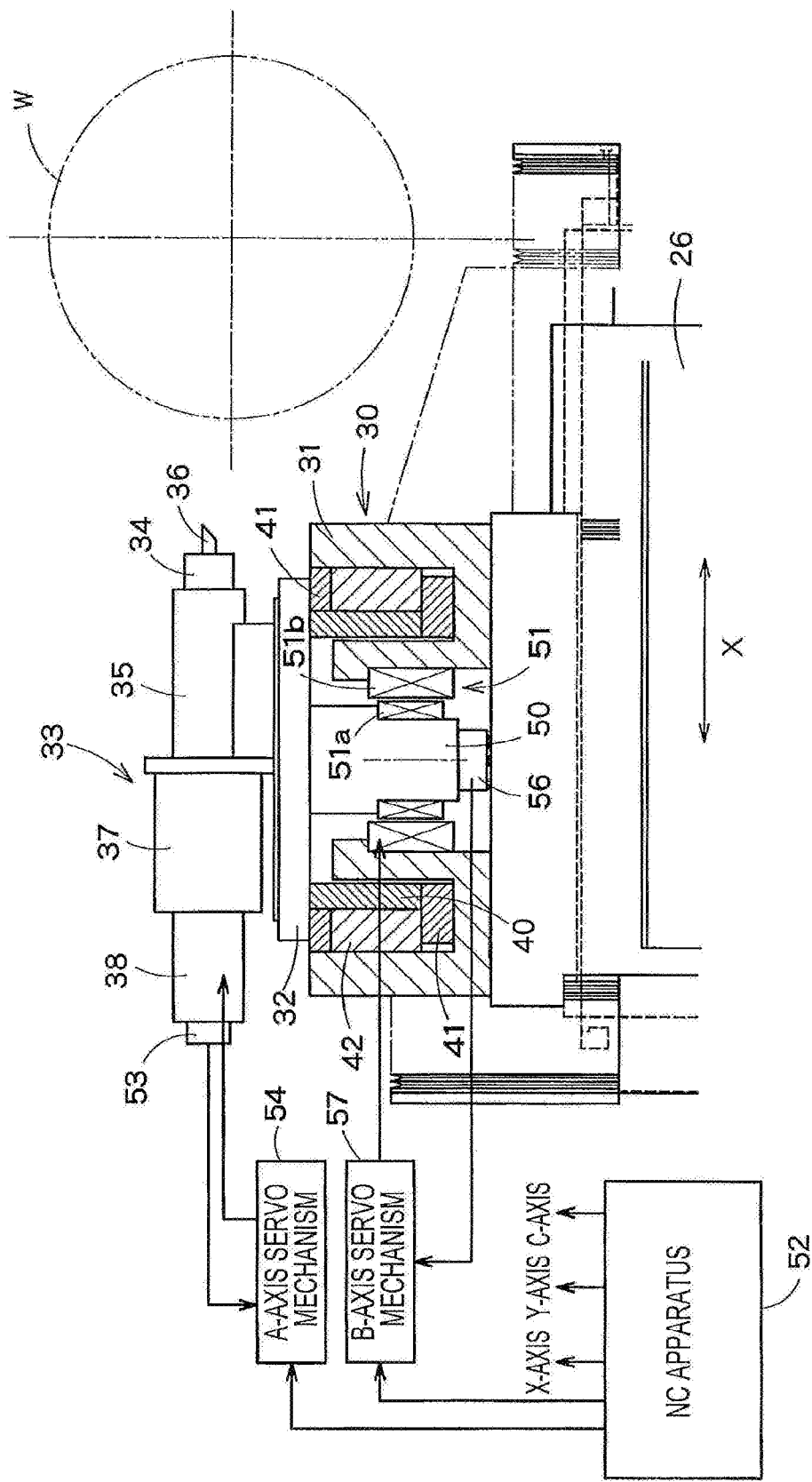
FIG. 4 is a diagram showing a cross section of the swivel of FIG. 3.

FIG. 3 is a diagram showing a swivel 30, with covers being removed from the bed 10 and the saddle 26. FIG. 4 shows a cross section of the swivel 30. The swivel 30 according to this embodiment includes a swivel body 31 and a top board 32.

A tool post 33 is detachably mounted on the top board 32 of the swivel 30. The tool post 33 has a unitized structure into which a tool holder 34, a bearing 35, a speed reducer 37 and a servo motor 38 are integrated. The unitized tool post 33 can be attached to and detached from the top board 32.

The tool holder 34 holds a diamond tool 36. A shaft of the tool holder 34 is rotatably supported by the bearing 35. To the bearing 35 is coupled an output shaft of the speed reducer 37, and to the output shaft is coupled the servo motor 38. Thus, the rotation of the servo motor 38 is slowed down by the speed reducer 37, and transmitted to the tool holder 34. The servo motor 38 is controlled to rotate the diamond tool 36 by a predetermined angle on an A-axis (a longitudinal axis of tool 36), as will be described later.

Referring to FIG. 4, a drive shaft 50 is coaxially mounted to the top board 32. A built-in servo motor 51 comprising a rotor 51a, which is secured to the drive shaft 50, and a stator 51b is provided within the swivel body 31. The drive shaft 50 is driven and rotated on a B-axis by the servo motor 51, so that the tool post 33 swivels together with the top board 32 for indexing of the diamond tool 36 of the tool post 33.

Referring to FIG. 3, a pair of X-axis guide rails 40, each having an inverted V-shaped guide surface, extends on the upper surface of the saddle 26. Each X-axis guide rail 40 has a limited-type rolling guide 41 comprised of many rollers held by a retainer. Similarly, a pair of Z-axis guide rails 42, each having an inverted V-shaped guide surface, extends on the upper surface of the bed 10. Each Z-axis guide rail 42 likewise has a limited-type rolling guide 43.

A Z-axis feed drive for feeding the saddle 26 and an X-axis feed drive for feeding the table 28 carrying the swivel 30 are each comprised of a linear motor. In FIG. 3, reference numeral 47 denotes a series of permanent magnets that constitute the linear motor of the X-axis feed mechanism, and 48 denotes a series of permanent magnets that extend parallel to the Z-axis guide rails 42.

In FIG. 4, reference numeral 52 denotes an NC apparatus. The NC apparatus 52 numerically controls the X-axis, the Z-axis, the A-axis, the B-axis and the C-axis. In the case of the A-axis, a position control loop is formed by an A-axis servo mechanism 54 and an encoder 53 which detects the angle of rotation of the diamond tool 36. Based on comparison of a command from the NC apparatus 52 with a position feedback from the encoder 53, the servo motor 38 is controlled so that the rake face of the diamond tool 36 will make a commanded angle relative to a reference radius extending perpendicularly to a longitudinal axis of tool 36. With respect to the B-axis, a position control loop is formed by a B-axis servo mechanism 57 and an encoder 56, and an indexing B-axis function is imparted to the drive shaft 50.

High-speed grooving, performed by using the above-described ultra-precision roll turning lathe, will now be described with reference to FIGS. 5 through 8.

Figure 5A:
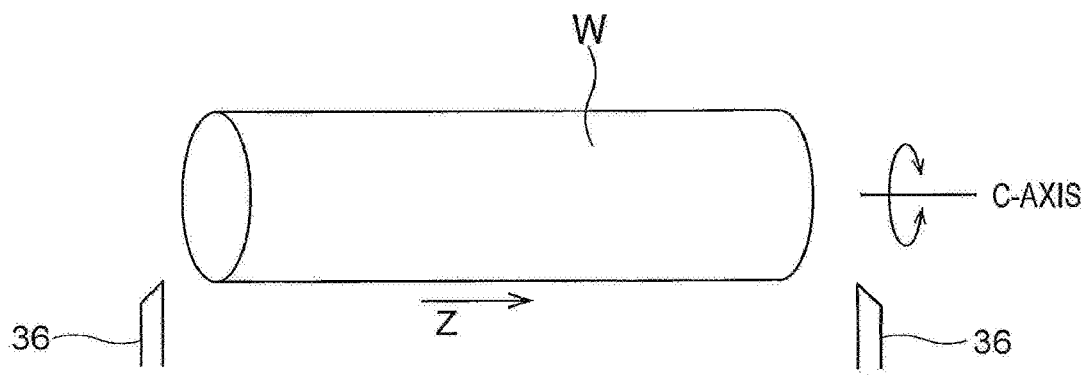
FIGS. 5A and 5B are diagrams illustrating the movement of a diamond tool upon machining of a longitudinal groove in the surface of a roll by the high-speed grooving method according to the first embodiment.
Figure 5B:
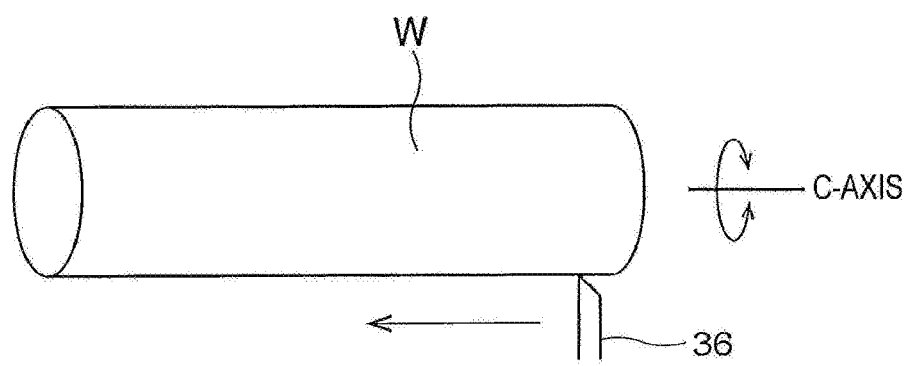

FIGS. 5A and 5B are diagrams illustrating the movement of the diamond tool 36 upon machining of a longitudinal groove (hereinafter sometimes referred to as a lateral groove) in the surface of the roll W.

Referring to FIG. 5A, a single lateral groove is machined in the surface of the roll W by feeding the diamond tool 36 from left to right along the Z-axis. For the purpose of illustration, feeding of the diamond tool 36 from left to right may be hereinafter referred to as a forward movement or stroke, and feeding of the diamond tool 36 from right to left as a backward or return movement or stroke (it is, of course, possible to refer to a right-to-left movement (or stroke) as a forward movement (or stroke), and a left-to-right movement (or stroke) as a backward or return movement (or stroke)). In the conventional method, machining of a groove is not performed during a return stroke after machining the groove during a forward stroke. This is because the rake face of the diamond tool 36 must face in the movement direction during machining of a groove. Thus, after machining the groove with the diamond tool 36 during a forward stroke, the groove cannot be further machined during a return stroke when the rake face faces the opposite direction to the movement direction.

When machining, for example, longitudinal 90-degree grooves having a pitch of 50 μm and a depth of 25 μm in the roll W, each groove is generally machined not in one step but in a plurality of, e.g. four, steps consisting of, for example, two rough machining steps, a pre-finish machining step and a finish machining step, thereby gradually deepening the groove. If such a machining process is performed by the conventional method in which machining of a groove is performed during only one stroke of a reciprocating movement of the diamond tool 36, the diamond tool 36 needs to reciprocate four times to machine each groove.

On the other hand, in the high-speed grooving method of this embodiment, machining of each grooves is not only performed during a left-to-right forward stroke of the diamond tool 36, but also performed during a right-to-left return stroke of the diamond tool 36 after it is turned 180 degrees about the A-axis from the direction during the forward stroke at the end of the forward stroke, as shown in FIG. 5B. Thus, a machining process for each groove, comprising two rough machining steps, a pre-finish machining step and a finish machining step, can be performed by reciprocating the diamond tool 36 only two times.

However, the 180-degree turning of the diamond tool 36, from a forward stroke to a return stroke, causes slight displacement of the position of the cutting edge of the diamond tool 36, which makes precision machining of the lateral grooves difficult. This is because even if the diamond tool 36 is produced with high precision, the cutting edge of the diamond tool 36 will not necessarily be positioned precisely on the axis of rotation of the tool. Thus, a slight error will be produced in the position of the cutting edge of the diamond tool 36.

Figure 6:
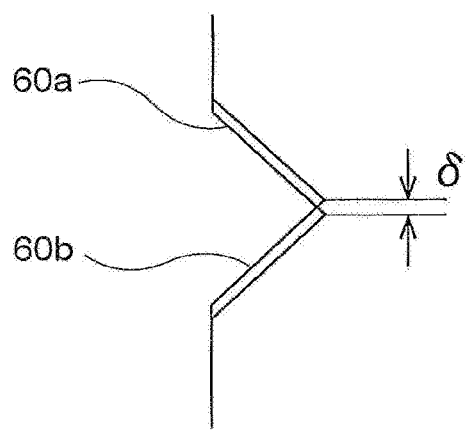
FIG. 6 is a diagram illustrating an error in the position of the cutting edge of a diamond tool, as observed when the diamond tool is turned 180 degrees.

Referring to FIG. 6, 60a denotes a groove machined by moving the diamond tool 36 rightward, i.e. through the forward movement of the diamond tool 36, and 60b denotes a groove machined by moving the diamond tool 36 leftward, i.e. through the return movement of the diamond tool 36. Because of a slight displacement δ of the position of the cutting edge of the diamond tool 36, produced by the 180-degree turning of the diamond tool 36, the cutting cross-section of the groove 60b does not overlap the cutting cross-section of the groove 60a.

In view of this, in the high-speed grooving method of this embodiment, dummy machining is performed in advance by reciprocating the diamond tool 36 on the roll W to machine a dummy groove. After completion of the dummy machining, the groove formed in the surface of the roll W is observed e.g. with a digital microscope (optical microscope) to measure the displacement δ. Every time the diamond tool 36 is turned 180 degrees upon switching from a forward movement to a backward or return movement, and vice versa during machining of lateral grooves, the roll W is indexed on the C-axis by an angle corresponding to the displacement δ, thereby performing a correction for eliminating the displacement δ.

FIGS. 7A through 7D illustrate an exemplary machining process, including steps of correcting the displacement δ by indexing of the roll W, according to the high-speed grooving method of the present invention.

In this embodiment, in order to machine a single lateral groove, the diamond tool 36 is reciprocated two times from end to end of the roll W in the axial direction, and two rough machining steps, a pre-finish machining step and a finish machining step are performed.

First, the diamond tool 36 is fed from left to right to perform first rough machining of a groove through the forward movement of the diamond tool 36 with a rake face of the tool 36 facing the cutting direction (FIG. 7A). After completion of the first rough machining step, the diamond tool 36 is turned 180 degrees on the A-axis relative to the position of a tool 36 about the A-axis during the forward movement. At the same time, the roll W is indexed on the C-axis by an angle corresponding to the displacement δ, thereby correcting the displacement δ.

Similarly, in the second rough machining step, machining of the groove is performed by allowing the diamond tool 36 to cut in the groove while feeding the diamond tool 36 from right to left (FIG. 17B). Thereafter, the diamond tool 36 is turned 180 degrees on the A-axis relative to the position of tool 36 about the A-axis during the return movement and, at the same time, the roll W is indexed on the C-axis to correct the displacement δ.

Next, in the pre-finish machining step, machining of the groove is performed by allowing the diamond tool 36 to cut in the groove shallower than the rough machining steps while feeding the diamond tool 36 rightward, i.e. forward. After completion of the pre-finish machining step, the diamond tool 36 is turned 180 degrees on the A-axis relative to the position of tool 36 about the A-axis during forward movement and, at the same time, the roll W is indexed on the C-axis to correct the displacement δ (FIG. 17C).

Lastly, the diamond tool 36 is moved leftward, i.e. backward to perform finish machining of the groove. After machining of a single lateral groove is completed in this manner, the machining position of the next lateral groove is indexed, and the above-described steps are repeated.

By thus repeatedly reversing the orientation of the diamond tool 36 about the A-axis and the displacement correction by indexing of the roll W after completion of each machining step, the cutting cross-section after reversing the orientation of the diamond tool 36 overlaps the cutting cross-section before the reversing. This makes it possible to achieve precision machining of lateral grooves. In addition, by performing machining of each groove both during a forward stroke and during a return stroke of the diamond tool 36, the machining efficiency can be significantly enhanced.

Figure 8:
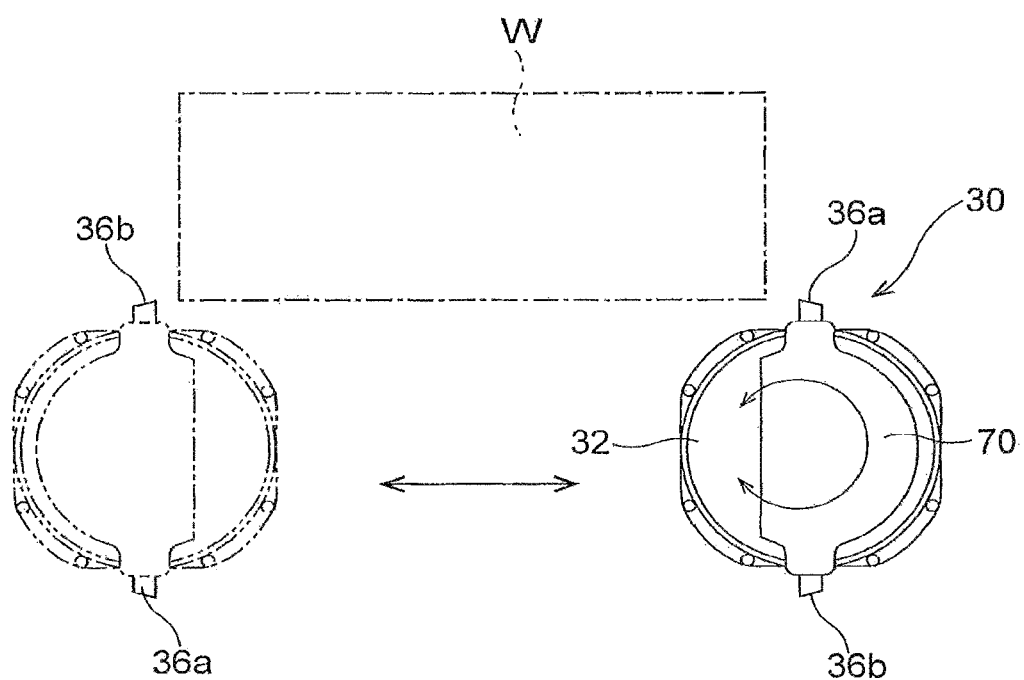
FIG. 8 is a plan view of a different type of tool post usable in the high-speed grooving method of the present invention.

A precision roll turning lathe, having a tool post as shown in FIG. 8, can also be used in the above-described grooving method.

The tool post 70 is detachably mounted on the top board 32 of the swivel 30. Diamond tools 36*a*, 36*b* are attached to the tool post 70 at 180-degree symmetrical positions with respect to the center of rotation. A built-in servo motor is provided within the swivel 30. The servo motor swivels the tool post 70 to swivel the diamond tools 36*a*, 36*b* through 180 degrees on a B-axis.

Every time the tool post 70 swivels 180 degrees, the diamond tools 36*a*, 36*b* alternately switch positions. The cutting edges of the diamond tools 36*a*, 36*b* face in 180-degree opposite directions in their machining positions. As shown in FIG. 8, the diamond tool 36*a* is used to machine the roll W during a left-to-right forward stroke, while the diamond tool 36*b* is used to machine the roll W during a right-to-left return stroke. Thus, the orientation of tool 36*a*, as it cuts in a forward stroke is 180 degrees opposite to the orientation of tool 36*b*, as it cuts in a return stroke.

The precision roll turning lathe having such a tool post can also perform the grooving method illustrated in FIG. 7 in exactly the same manner.

While the present invention has been described with reference to machining with the roll turning lathe, the grooving method according to the present invention can be applied also to machining of fine grooves in a plate-like workpiece, performed by using a planer machine.

The planer machine has an X-axis along which a table, on which a workpiece is placed, is moved backward and forward, a Y-axis along which a diamond tool is moved in a horizontal direction, a Z-axis along which the diamond tool is moved in a vertical direction, and a C-axis on which the diamond too is turned 180 degrees.

In a grooving process using the planer machine, dummy machining is performed in advance by reciprocating the diamond tool on a workpiece along the X-axis. After completion of the dummy machining, a groove formed in the surface of the workpiece is observed e.g. with a digital microscope (optical microscope) to measure a displacement δ of the position of the cutting edge of the diamond tool. Every time the diamond tool is turned 180 degrees upon switching from a forward movement to a backward or return movement, and vice versa during machining of grooves, the diamond tool is moved along the Y-axis a slight distance corresponding to the displacement δ, thereby performing a correction for eliminating the displacement δ.

In the case of using two rough machining steps, a pre-finish machining step and a finish machining step to machine a single lateral groove, machining of lateral grooves is performed in the following manner:

1. First rough machining during a forward stroke—180-degree turning of the diamond tool—displacement correction by the Y-axis
2. Second rough machining during a return stroke—180-degree turning of the diamond tool—displacement correction by the Y-axis
3. Pre-finish machining during a forward stroke—180-degree turning of the diamond tool—displacement correction by the Y-axis
4. Finish machining during a return stroke After completion of the above machining process, the diamond tool is moved to a machining position for the next groove, and machining of the groove is carried out in the same manner. The same operation is repeated to machine the subsequent grooves.

Second Embodiment

A high-speed grooving method according to a second embodiment of the present invention will now be described with reference to FIGS. 9 and 10. The second embodiment is suitable in cases where the displacement of a cutting tool cannot be completely corrected by the grooving method of the first embodiment. In some cases, even when dummy machining is performed by reciprocating the diamond tool 36 and a groove, formed in the surface of the roll W, is observed with a digital microscope (optical microscope) to measure a displacement δ as shown in FIG. 6, the error cannot be completely eliminated based on the measurement results.

FIGS. 9A through 9F illustrate an exemplary process for machining fine lateral longitudinal grooves in the surface of the roll W by performing the high-speed grooving method of the second embodiment.

In the second embodiment, in order to machine a single lateral groove, the diamond tool 36 is reciprocated two and a half times from end to end of the roll W in the axial direction. During the reciprocations, two rough machining steps, a step of moving the diamond tool 36 without cutting, a pre-finish machining step and a finish machining step are performed.

First, the diamond tool 36 is fed from left to right to perform first rough machining L1 of a lateral groove during a forward stroke of the diamond tool 36 (FIG. 9A). After completion of the first rough machining step, the diamond tool 36 is turned 180 degrees on the A-axis.

Next, the diamond tool 36 is fed from right to left (R1). During the return stroke, the diamond tool 36 is simply moved in the axial direction of the roll W without cutting in the groove, i.e. without performing rough machining of the groove (FIG. 9B). After completion of the backward movement (return stroke), the diamond tool 36 is turned 180 degrees.

Next, in the second rough machining step L2, machining of the groove is performed by allowing the diamond tool 36 to cut in the groove while feeding the diamond tool 36 from left to right (FIG. 9C). Thereafter, the diamond tool 36 is turned 180 degrees. The cutting cross-section of the diamond tool 36 in the second rough machining L2 overlaps that in the first rough machining L1. Therefore, the groove can be roughly machined deep without forming a stepped portion in the groove.

Next, in the pre-finish machining step R2, machining of the groove is performed by allowing the diamond tool 36 to cut in the groove while feeding the diamond tool 36 from right to left (FIG. 9D). Thereafter, the diamond tool 36 is turned 180 degrees. A stepped portion can sometimes be formed in the groove due to a displacement δ of the cutting edge of the diamond tool 36, caused by the rotation of the diamond tool 36.

In this embodiment, instead of performing the finish machining step subsequent to the pre-finish machining step R2, first rough machining L3 of the next groove is performed by first shifting the position of the diamond tool 36 on the roll W to a position for machining of the next groove, and then feeding the diamond tool 36 from left to right (FIG. 9E).

Thereafter, the position of the diamond tool 36 on the roll W is returned to the position of the previous groove which has undergone the pre-finish machining R2, and finish machining R3 of the groove is performed by allowing the diamond tool 36 to cut in the groove while feeding the diamond tool 36 from right to left (FIG. 9F).

Figure 10:
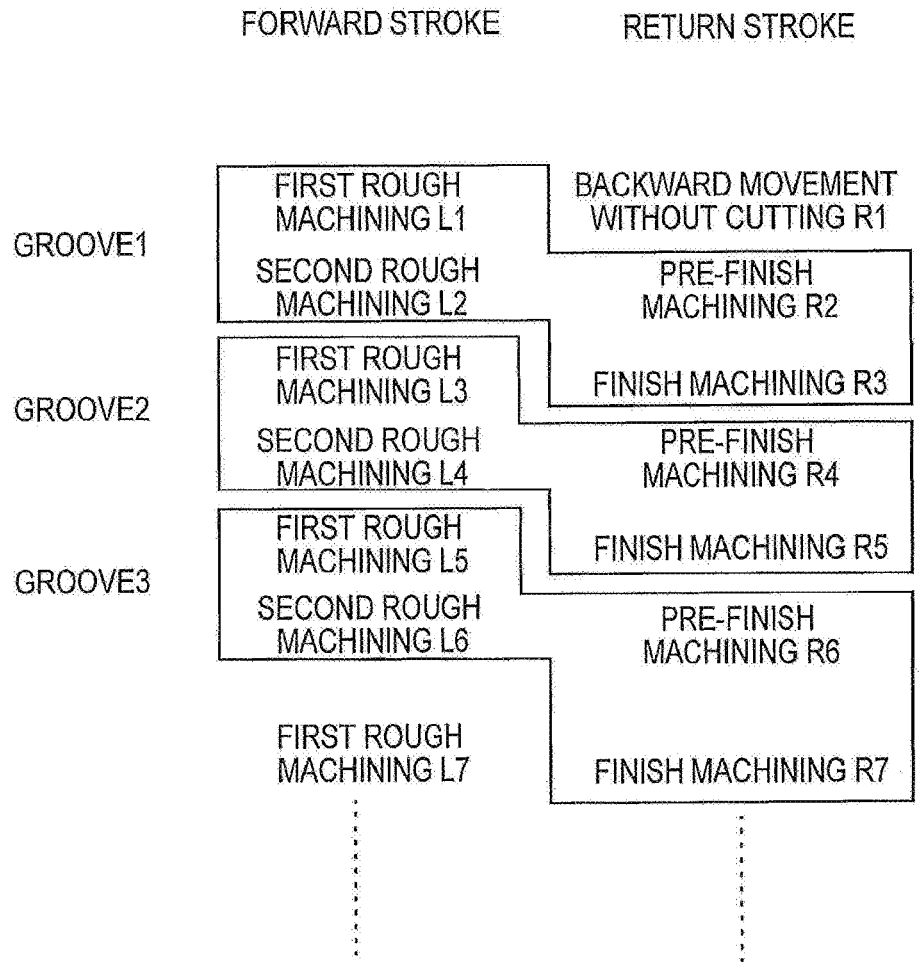
FIG. 10 is a diagram illustrating a relationship of a rough machining step, a pre-finish machining step and a finish machining step with a cutting direction in the high-speed grooving method of FIG. 9.

The above operation is repeated to machine the next and subsequent grooves, as illustrated in FIG. 10.

As can be seen in FIG. 10, the rough machining steps are each performed e.g. during a left-to-right forward stroke of the diamond tool 36, and the pre-finish machining steps and the finish machining steps are each performed e.g. during a right-to-left return stroke of the diamond tool 36. If the rough machining steps are performed during a right-to-left forward stroke, then the pre-finish machining steps and the finish machining steps are to be performed during a left-to-right return stroke.

Thus, each groove is always cut in the same direction in the rough machining steps, while in the pre-finish machining step and the finish machining step, the groove is always cut in the opposite direction. Therefore, the cutting cross-section in the finish machining step always overlaps the cutting cross-section in the pre-finish machining step. Accordingly, the displacement δ, caused by the reversal of the orientation of the diamond tool 36, is absorbed in the finish machining step. This makes it possible to achieve precision machining of lateral grooves. In addition, since machining of each groove can be performed both during a forward stroke and during a return stroke of the diamond tool 36, the machining efficiency can be significantly enhanced.

The above-described grooving method according to the present invention can be applied also to machining of fine grooves in a plate-like workpiece, performed by using a planer machine.

The invention claimed is:

1. A high-speed grooving method for cutting and machining fine grooves in the surface of a workpiece by moving a cutting tool relative to the workpiece, said method comprising:
first machining a dummy groove in the surface of the workpiece by moving the cutting tool relative to the workpiece in a first machining direction of the workpiece, then orienting the cutting tool 180 degrees as compared to the first machining, and subsequently second machining the dummy groove by moving the cutting tool in a second direction opposite to the first direction;
measuring a displacement of a cutting edge of the cutting tool, caused by the first and second machining of the dummy groove;
machining a groove with the cutting tool in the surface of the workpiece in a forward stroke by moving the cutting tool relative to the workpiece in the first direction;
orienting the cutting tool 180 degrees from an orientation of the cutting tool during the forward-stroke machining, thereby setting a second orientation of the cutting edge of the cutting tool to a direction opposite to a first orientation of the cutting edge in the forward stroke so that the workpiece can be machined during a return stroke of the cutting tool;
correcting a relative position between the workpiece and the cutting tool so as to eliminate the displacement; and
machining the groove, which has been machined in the forward stroke, with the cutting tool by moving the cutting tool relative to the workpiece in the direction opposite to the first direction in a return stroke, wherein the forward-stroke machining, the cutting tool orienting, the correcting and the return-stroke machining are repeated to perform a machining process, including a rough machining step and a finish machining step, for machining a single groove.

2. The high-speed grooving method according to claim 1, wherein the workpiece is a roll to be machined with a roll turning lathe, wherein the groove is a groove extending in a longitudinal direction of the roll, and wherein in the correction step, the roll is indexed by an angle corresponding to the displacement, thereby eliminating the displacement.

3. A high-speed grooving method for cutting and machining fine grooves in the surface of a workpiece by moving a cutting tool relative to the workpiece, said method comprising:
machining a groove with the cutting tool in the surface of the workpiece in a forward stroke by moving the cutting tool relative to the workpiece in a first machining direction;
orienting the cutting tool 180 degrees after completion of the forward-stroke machining, thereby setting a second orienting of a cutting edge of the cutting tool to a direction opposite to a first orienting of the cutting edge in the forward stroke so that the workpiece can be machined during a return stroke of the cutting tool; and
machining the groove, which has been machined in the forward stroke, with the cutting tool by moving the cutting tool relative to the workpiece at least twice in the direction opposite to the first direction in a return stroke, wherein a rough machining for the groove is performed in the forward-stroke machining, and a pre-finish machining and a finish machining for the groove are each performed in a return-stroke machining in which the groove is machined in an opposite direction to the rough machining.

4. The high-speed grooving method according to claim 3, wherein a single groove is machined by a process comprising the rough machining, a second rough machining in a second forward stroke, the pre-finish machining and the finish machining, and wherein in a machining process for the single groove, after completion of the first rough machining, the cutting tool makes a return stroke without cutting in the groove, and in a first rough machining for a subsequent groove is performed prior to the finish machining for the single groove.

5. The high-speed grooving method according to claim 3, wherein the workpiece is a roll to be machined with a roll turning lathe, and wherein the groove is a groove extending in the axial direction of the roll.

6. The high-speed grooving method according to claim 4, wherein the workpiece is a roll to be machined with a roll turning lathe, and wherein the groove is a groove extending in the axial direction of the roll.

* * * * *